US006206624B1

United States Patent
Brandenburg

(10) Patent No.: US 6,206,624 B1
(45) Date of Patent: *Mar. 27, 2001

(54) CARGO SPACE DIVIDER

(76) Inventor: Rachel B. Brandenburg, 560 Bagby Rd., Crittenden, KY (US) 41030

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/225,095

(22) Filed: Jan. 4, 1998

(51) Int. Cl.[7] ........................................ B60P 7/14
(52) U.S. Cl. .................. 410/132; 410/121; 410/129; 410/142
(58) Field of Search ........................ 410/121, 129, 410/130, 132, 141, 142, 143–145; 296/37.1, 37.6; 220/530, 551, 552; 224/42.33

(56) References Cited

U.S. PATENT DOCUMENTS

| 2,565,997 | 8/1951 | Stone . | |
|---|---|---|---|
| 4,236,854 | * 12/1980 | Rogers | 410/121 |
| 4,396,325 | 8/1983 | Joice-Cavanagh | 410/129 |
| 4,733,899 | 3/1988 | Keys . | |
| 4,917,429 | 4/1990 | Giger . | |
| 4,961,677 | 10/1990 | Downard | 410/129 |
| 5,259,712 | * 11/1993 | Wayne | 410/152 |
| 5,265,993 | 11/1993 | Wayne | 410/129 |
| 5,427,487 | * 6/1995 | Brosfske | 410/121 |
| 5,443,586 | * 8/1995 | Cargill | 410/143 |
| 5,520,314 | 5/1996 | Tkachuk . | |
| 5,526,972 | 6/1996 | Frazier et al. . | |
| 5,586,850 | 12/1996 | Johnson | 410/138 |
| 5,697,742 | * 12/1997 | House | 410/129 X |
| 5,709,512 | * 1/1998 | Smith | 410/129 |

FOREIGN PATENT DOCUMENTS

2229982A * 10/1990 (GB) .................. 224/42.33

* cited by examiner

Primary Examiner—Stephen T. Gordon
(74) Attorney, Agent, or Firm—Wood, Herron & Evans, L.L.P.

(57) ABSTRACT

Disclosed is a cargo space divider wherein a system of dividing walls allow a cargo space, preferably a pick-up truck bed, to be sectioned off into smaller, variably sized sections in order to prevent objects transported therein from rolling or sliding about the bed. The device consists of a pair of support rails that are installed along and clamped to the sidewalls of the truck bed above the wheel wells. Lateral sectioning walls span the width of the truck bed and longitudinal sectioning walls span between the lateral sectioning walls, both in adjustable positions, thus creating divided cargo spaces that are adjustable both in number and size.

9 Claims, 5 Drawing Sheets

CARGO SPACE DIVIDER

BACKGROUND OF THE INVENTION

1. Field of the Invention

The present invention relates generally to devices intended to aid in the transportation of goods, and more specifically to a cargo space divider for use in trucks, vans and the like that adjustably divides cargo space, creating compartments in which to store items, keeping them separated and preventing them from damage caused as a result of sliding and rolling about the cargo space.

2. Description of the Related Art

At one time, the pick-up truck was the working man's vehicle seen mainly on farms and construction sites. Today, however, the pick-up truck has gained a more popular status, finding its way into the driveways of a wide variety of owners ranging from accountants to doctors and lawyers. The utility of owning a vehicle that is equipped with many of the luxury features found on most passenger cars while providing the ability to haul large items is the main attraction for owning such a vehicle. There are, however, drawbacks to owning such a vehicle. One such drawback has to do with hauling smaller items that would typically be transported in an automobile trunk or in the passenger compartment. In a pick-up truck, these items tend to roll about the bed of the truck, possibly becoming damaged. For example, when groceries are placed in a truck bed, they tend to become spread about the bed as the truck is driven. Furthermore, larger objects that may tend to slide or roll about, such as lawnmowers must be constantly be tied or strapped down in order to prevent such movement. Accordingly, there is a need for a means by which a pick-up truck bed can be sectioned off in order to provide a more confined storage space for transporting objects that is adjustable so as to allow for the secure transportation of a variety of objects. The development of the present invention fulfills this need.

A search of the prior art did not disclose any patents that read directly on the claims of the instant invention. However, several references including cargo space dividers of varying configurations were discovered. These devices neither anticipate nor disclose any embodiment that would preclude the novelty and the utilitarian functionality of the features of the present invention.

U.S. Pat. No. 5,265,993, issued in the name of Wayne, discloses a truck bed divider system wherein a series of dividing walls are frictionally fit inside a truck bed in both the longitudinal and lateral directions in order to divide the space for transporting objects. The size of the compartments is adjustable in both directions, however doing so requires dividing walls of varying lengths.

Several patents disclose cargo area dividers for trucks and the like that incorporate the use of dividing walls to divide the space:

---

U.S. Pat. No. 5,586,850, issued in the name of Johnson;
U.S. Pat. No. 5,526,972, issued in the name of Frazier et al.;
U.S. Pat. No. 4,917,429, issued in the name of Giger;
U.S. Pat. No. 4,733,899, issued in the name of Keys;
U.S. Pat. No. 4,961,677, issued in the name of Downard, Jr.;
U.S. Pat. No. 4,396,325, issued in the name of Joice-Cavanagh; and
U.S. Pat. No. 2,565,997, issued in the name of Stone.

---

While many of these devices incorporate the use of dividing walls capable of being variably spaced within the cargo bed, none of these patents disclose dividing walls that are adjustable in both the longitudinal and lateral directions.

U.S. Pat. No. 5,520,314, issued in the name of Tkachuk, discloses a basket-like insertion that fits inside a truck bed.

While several features exhibited within these references may be incorporated into this invention, alone and in combination with other elements, the present invention is sufficiently different so as to make it distinguishable over the prior art.

SUMMARY OF THE INVENTION

The present invention consists of a cargo space divider wherein a system of dividing walls allows a cargo space, preferably a pick-up truck bed, to be sectioned off into smaller, variably sized sections in order to prevent objects transported therein from rolling or sliding about the bed. The device consists of a pair of support rails that are installed along and clamped to the sidewalls of the truck bed above the wheel wells. The rails themselves are adjustable so as to accommodate truck beds of varying sizes. The rails include a series of peg receiving apertures, spaced evenly along its length, that retain pegs that are used to support lateral sectioning walls spanning across the bed. The lateral sectioning walls are telescopically adjustable so as to fit truck beds of varying widths. Longitudinal sectioning walls attach to the lateral sectioning walls and can be adjusted to a variety of positions along the length of the lateral sectioning walls. The longitudinal sectioning walls are telescopically adjustable, allowing them to be secured to lateral sectioning walls spaced apart in varying degrees. Thus, the present invention allows for variably sized cargo space division in both the longitudinal and lateral dimensions, allowing the user to transport cargo of varying sizes without spillage or the need to tie it down.

It is therefore an object of the present invention to provide a cargo space divider that allows a pick-up truck bed or the like to be sectioned-off into smaller confined spaces for transporting smaller items in a safe and secure manner.

It is another object of the present invention to provide a cargo space divider that incorporates the use of dividing walls that section the cargo area in both the longitudinal and lateral dimensions.

It is another object of the present invention to provide a cargo space divider having lateral dividing walls that are capable of being positioned variably along the length of the cargo area, spanning its width.

It is another object of the present invention to provide a cargo space divider having lateral dividing walls that adjust telescopically so as to allow for installation in cargo areas of varying widths.

It is another object of the present invention to provide a cargo space divider having longitudinal dividing walls that connect to a pair of adjacent lateral dividing walls, spanning there between.

It is another object of the present invention to provide a cargo space divider having longitudinal dividing walls that adjust telescopically so as to allow for connection between a pair of adjacent lateral dividing walls being of varying relative spacing.

It is another object of the present invention to provide a cargo space divider that is easy to install and is adjustable so as to fit cargo spaces of varying size.

It is another object of the present invention to provide a cargo space divider that is sturdy in both construction and installation, providing a stable load support for items carried therein.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

LIST OF REFERENCE NUMBERS

10 Pick-Up Truck 30 Divider Wall Pin Receiving
11 Cargo Space Divider Apertures
12 Side Rails 31 Longitudinal Divider Wall
13 Truck Bed 32 Support Brackets
14 Cargo Area 33 Lower Edge
15 Wheel Well 40 Pin Housing
16 Truck Cab 41 Locking Pin Support Bracket
17 Tailgate 42 Pin Interior Cavity
20 Support Rail 45 Pin Actuator
21 C-Clamp Device 46 Biasing Spring
22 Side Rail Flange 47 Button End
25 Support Rail Pin Aperture 50 Ball Stop
26 Traversing Divider Wall 51 Ball Stop Aperture
27 Locking Pin Mechanism 55 Ball Stop Recess
29 Divided Cargo Space 56 Ball Stop Groove

DESCRIPTION OF THE PREFERRED EMBODIMENTS

1. Detailed Description of the Figures

Figure 1:
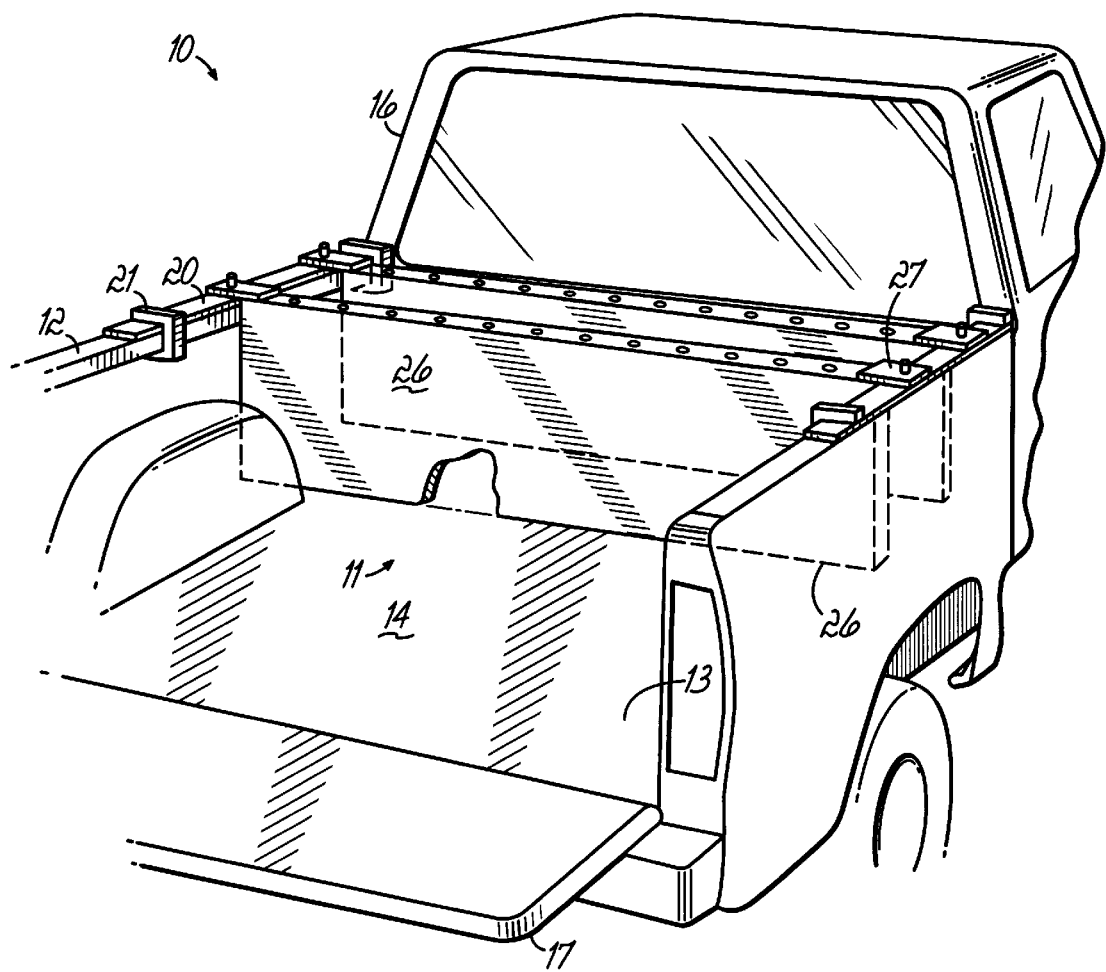
FIG. 1 is a perspective view of a pick-up truck fit with a cargo space divider, according to the preferred embodiment of the present invention.

Referring now to FIG. 1, depicted is a conventional pick-up truck 10 that has a cab 16, bed 13, and tailgate 17, and is fit with the cargo space divider 11, according to the preferred embodiment of the present invention. The cargo space divider 11 is secured to the side rails 12 of the truck bed 13, thus dividing the cargo area 14 and allowing for the securement and stabilization of smaller items during transportation.

Figure 2:
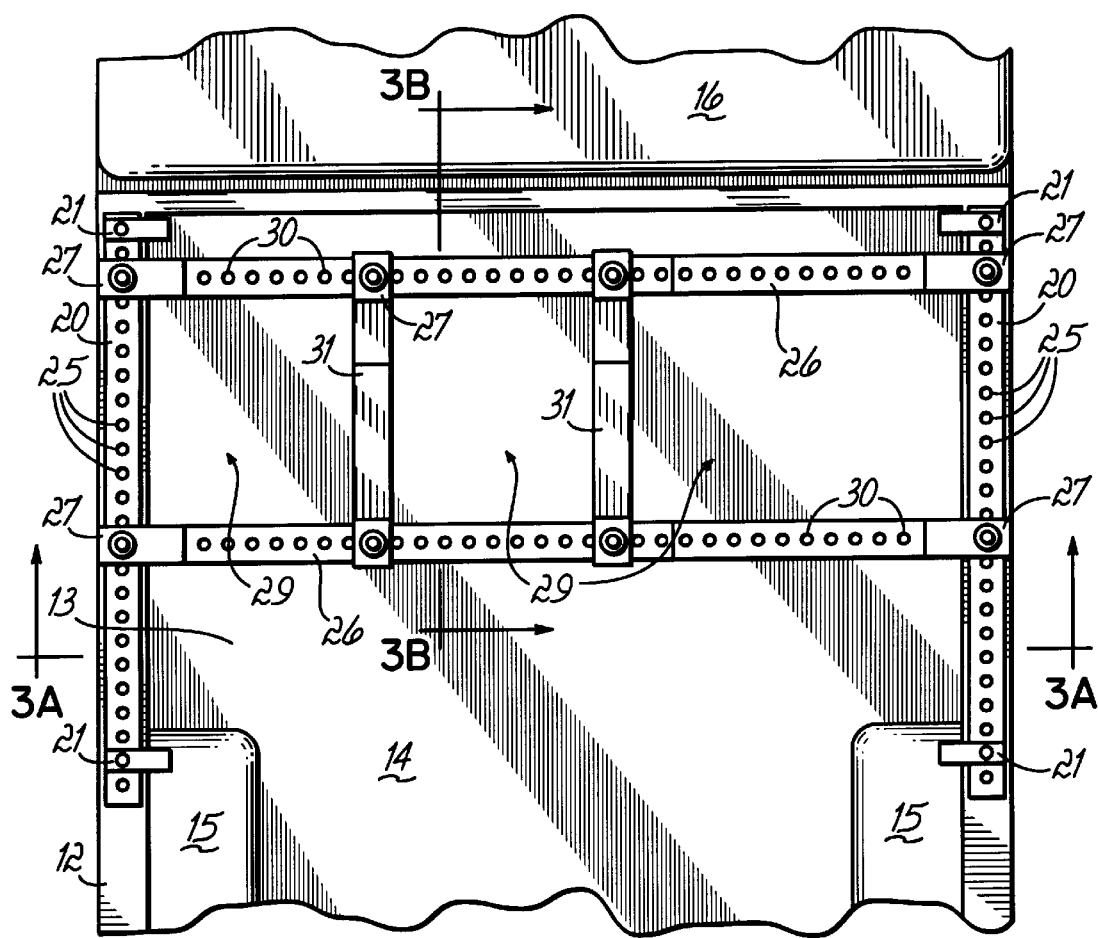
FIG. 2 is a top view of a pick-up truck bed cargo space fit with a cargo space divider, according to the preferred embodiment of the present invention.
Figure 3A:
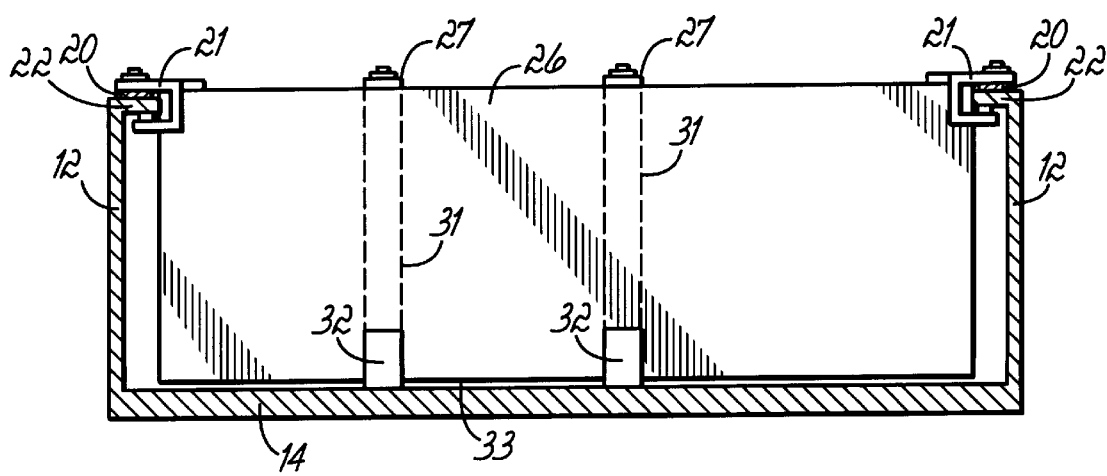
FIG. 3a is a rear sectional view of a pick-up truck bed cargo space fit with a cargo space divider taken along line IIIa as shown in FIG. 2, according to the preferred embodiment of the present invention.
Figure 3B:
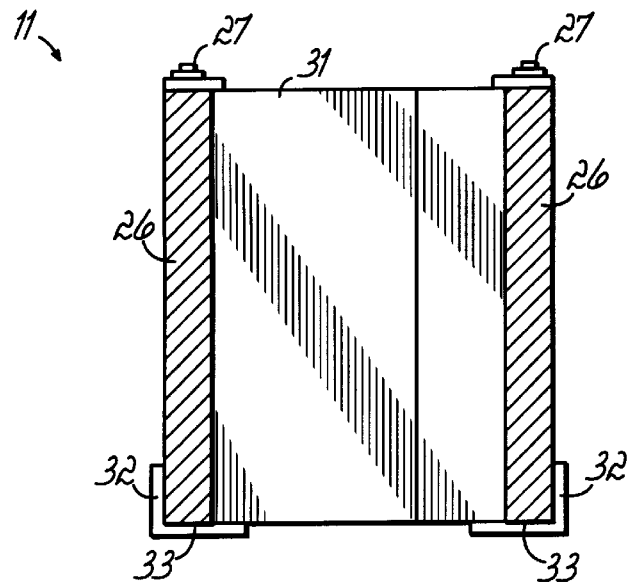
FIG. 3b is a side sectional view of a pick-up truck bed cargo space fit with a cargo space divider taken along line IIIb as shown in FIG. 2, according to the preferred embodiment of the present invention.

Referring now to FIGS. 2, 3a and 3b, the cargo space divider 11 is depicted installed in a truck bed 13, according to the preferred embodiment of the present invention. In the preferred embodiment, the cargo space divider 11 is secured to the side rails 12 between the wheel wells 15 and the truck cab 16, although other placements along the entire length of the truck bed 13 are equally acceptable and effective. The placement in the preferred embodiment assumes that the placement nearest the truck cab 16 would offer the most convenience to the driver being that it is adjacent to the passenger compartment. Another factor leading to the placement of the cargo space divider 11 near the truck cab 16 is the fact that wind turbulence is slighter in that location than toward the rear of the truck bed 13, near the tailgate 17.

The cargo space divider 11 consists of a pair of support rails 20 that are attached to the side rails 12 with a plurality of C-clamp devices 21. The C-clamp devices 21 are used to secure the support rails 20 to the side rail flange 22 located on the upper side of the side rails 12, providing a strong and stable support for the cargo space divider 11. Each support rail has a series of support rail pin apertures 25 along its length. The support rail pin apertures 25 are used to secure and support at least one traversing divider wall 26, spanning the width of the truck bed 13. The traversing divider walls 26 are secured to the support rail 20 via a locking pin mechanism 27 that works in conjunction with the support rail pin apertures 25. The operation of the locking pin mechanism 27 will be discussed in further detail herein below. The traversing divider walls 26 are of a two-piece construction, allowing them to be adjusted telescopically so as to fit in truck beds 13 of varying widths.

The installation of the cargo space divider 11 creates a divided cargo space 29 that sections-off the cargo space 14. Installation of the traversing divider walls 26 alone creates a divided cargo space 29 that spans the entire width of the truck bed 13 and is adjustable in only one dimension as defined by the position of the traversing divider walls 26 along the support rails 20. Each traversing divider wall has a series of divider wall pin receiving apertures 30 along its length. The divider wall pin receiving apertures are used to secure and support at least one longitudinal divider wall 31, spanning between the traversing divider walls 26. The longitudinal divider walls 31 are secured to the traversing divider walls 26 via a locking pin mechanism 27 that works in conjunction with the divider wall pin receiving apertures 30. This locking pin mechanism 27 is identical to the locking pin mechanism used to secure the traversing divider walls 26 to the support rails 20 and will be discussed in further detail herein below. The longitudinal divider walls also include support brackets 32 that accept the lower edge 33 of the traversing divider walls 26, creating a more stable and secure assembly. The longitudinal divider walls 31 are of a two-piece construction, allowing them to be adjusted telescopically so as to fit in truck beds 13 of varying widths. The installation of the longitudinal divider walls 31, spanning the distance between the traversing divider walls 26 creates a division of the divided cargo space 29 defined by the traversing divider walls 26. The telescoping construction of the longitudinal divider walls 31 coupled with the variable placement of both the traversing divider walls 26 and the longitudinal divider walls 31 using the locking pin mechanism 27 allows for a wide variety of configurations of the cargo space divider 11 wherein a variable number of divided cargo spaces 29 having variable dimensions along both the length and width of the truck bed 13 are possible.

Figure 4:
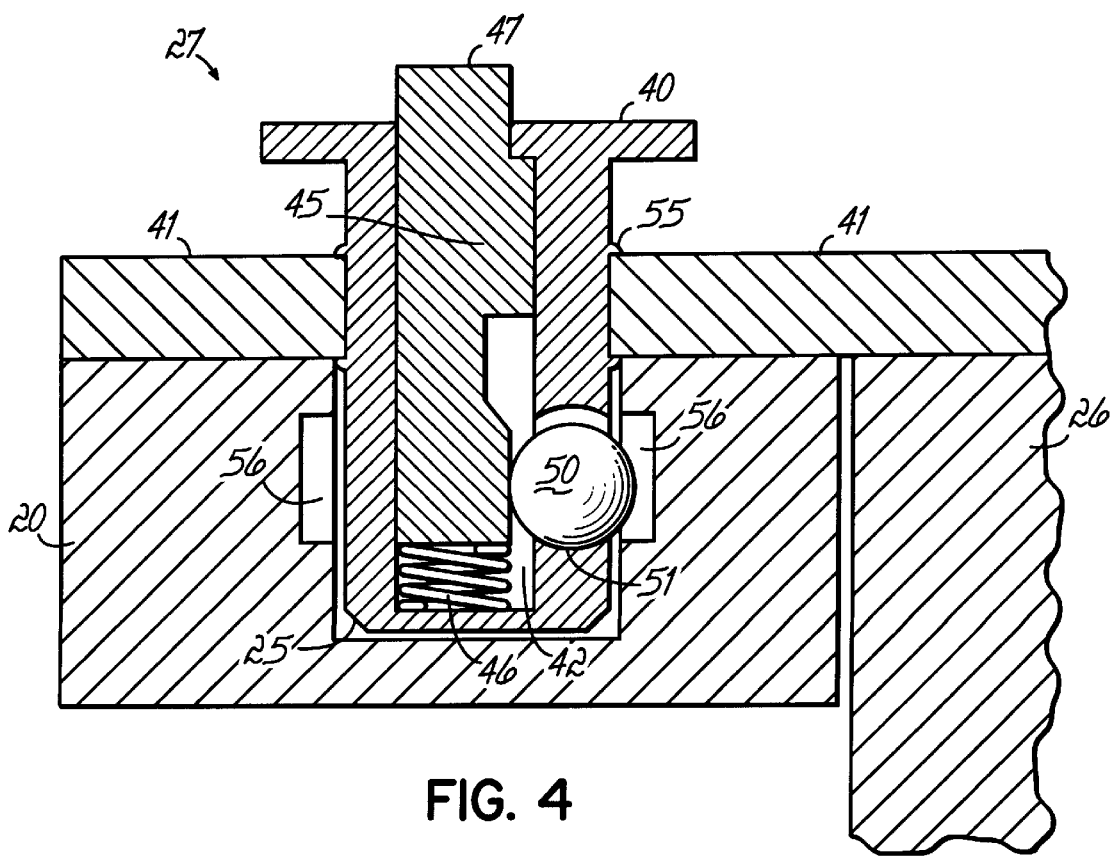
FIG. 4 is a side sectional view of the locking retaining pin incorporated into the design of the cargo space divider, according to the preferred embodiment of the present invention.

Referring now to FIG. 4, depicted is the locking pin mechanism 27 used in conjunction with the cargo space divider 11, according to the preferred embodiment of the present invention. It should be noted that the use of the locking pin mechanism 27 is merely the preferred method of attachment and it is realized that many conventional fastening devices could be incorporated into the design of the cargo space divider 11, producing equally desirable results. Furthermore, as discussed previously, the locking pin mechanism 27 is used to secure the traversing divider walls 26 to the support rails 20 and also to secure the longitudinal divider walls 31 to the traversing divider walls 26. In FIG. 4 the use of the locking pin mechanism 27 is depicted in its use securing a traversing divider wall 26 to a support rail 20 although, for all intents and purposes, its operation in both scenarios is identical.

The locking pin mechanism 27 consists of an elongated pin housing 40 that is attached to a locking pin support bracket 41. The locking pin support bracket 41 is used to secure the locking pin mechanism 27 to the traversing divider wall 26. The pin housing 40 forms a pin interior cavity 42 that houses an elongated pin actuator 45. The pin actuator 45 is supported in the pin interior cavity 42 by a biasing spring 46 that maintains the button end 47 of the pin actuator 45 in a position protruding from the pin interior cavity 42. A ball stop 50 is also supported inside the pin interior cavity 42. A circular ball stop aperture 51 located on the side of the pin housing and having a diameter smaller than that of the ball stop 50 allows the ball stop 50 to protrude from the exterior of the pin housing. The pin actuator 45 is machined so as to have a ball stop recess 55 that serves as a cam against the ball stop 50. In the normal position, i.e. when the pin actuator 45 is at rest in the extended position created by the biasing spring 46, the ball stop 50 is biased so as to protrude from the ball stop aperture 51. As the pin actuator 45 is operated against the biasing spring 46, the ball stop recess 55 meets the ball stop 50, releasing it to enter the pin housing 40.

The locking pin mechanism 27 is used to secure the traversing divider wall 26 to the support rail 20 by inserting the pin housing into the support rail pin aperture 25. The tolerance between the outside diameter of the pin housing 40 and the inside diameter of the support rail pin aperture 25 is close, such that an interference is created between the ball stop 50 and the support rail pin aperture 25 when the ball stop 50 is protruding from the ball stop aperture 51. Thus, in order to insert the pin housing 40 into the support rail pin aperture 25, the button end 47 must be depressed so that the ball stop 50 enters the ball stop aperture 51, relieving the interference between the ball stop 50 and the support rail pin aperture 25. Once the pin housing is inserted into the support rail pin aperture 25, the button end 47 is released, releasing the pin actuator 45 from the biasing spring 46. A ball stop groove 56, machined along the interior of the support rail pin aperture 25, receives the ball stop 50 as it is biased by the pin actuator 45 and protrudes from the ball stop aperture 51. In doing so, an interference fit is created that secures the locking pin mechanism 27 in the support rail pin aperture 25, thus securing the traversing divider wall 26 to the support rail 20.

2. Operation of the Preferred Embodiment

Figure 5:
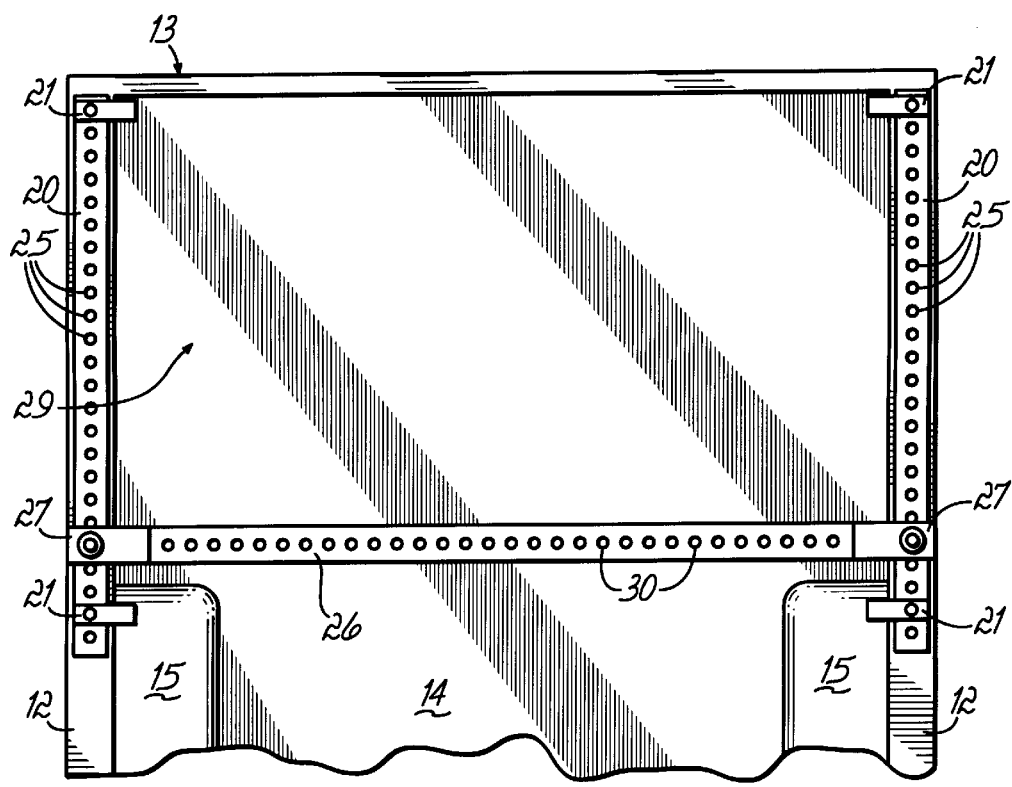
FIG. 5 is a top view of a pick-up truck bed cargo space fit with a cargo space divider depicting its use in defining a single large divided space, according to the preferred embodiment of the present invention.

In accordance with the preferred embodiment of the present invention and as shown in FIG. 5, the cargo space divider 11 is depicted creating a single, large divided cargo space 29 that spans the entire width of the truck bed 13. The support rails 20 are secured to the side rails 12 via the C-clamp devices 21 and a traversing divider wall 26 is secured to the support rails 20 by the locking pin mechanism 27, thus defining the divided cargo space 29. The size of the divided cargo space 29 can be adjusted by moving the traversing divider wall 26 along the length of the support rails 20.

Figure 6:
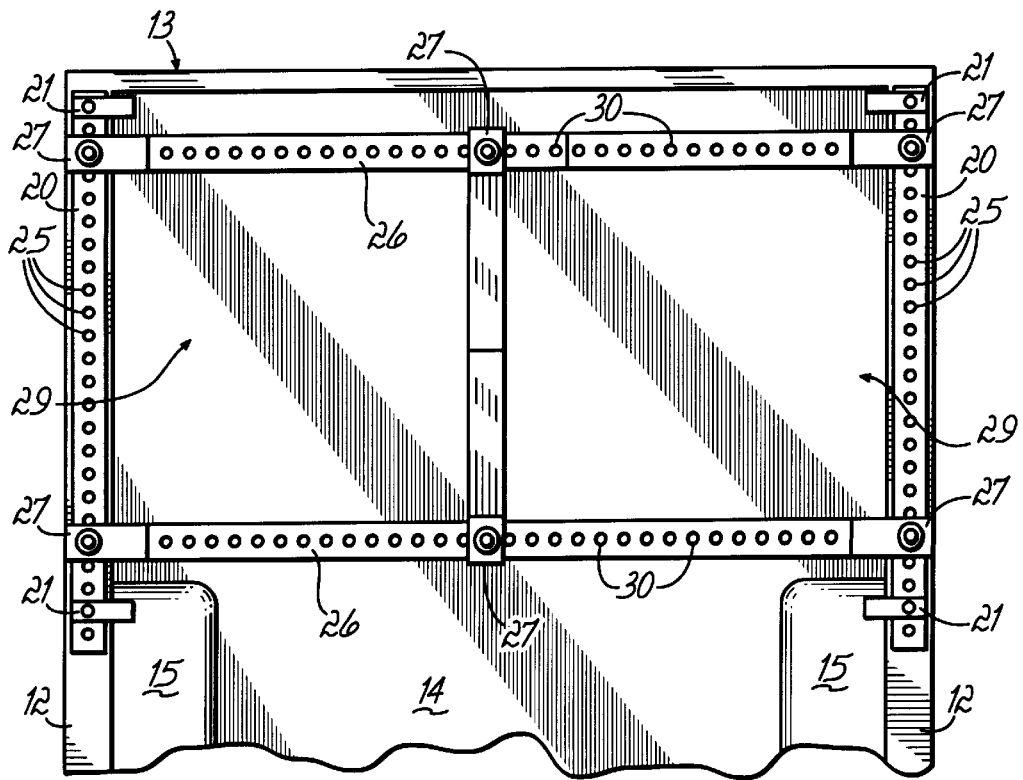
FIG. 6 is a top view of a pick-up truck bed cargo space fit with a cargo space divider depicting its use in defining a pair of divided spaces, according to the preferred embodiment of the present invention.

Referring now to FIG. 6, the cargo space divider 11 is depicted creating a pair of large divided cargo spaces 29 within the truck bed 13. The support rails 20 are secured to the side rails 12 via the C-clamp devices 21 and a pair of traversing divider walls 26 are secured to the support rails 20 by the locking pin mechanism 27. A longitudinal divider wall 31 is secured to the traversing divider walls 26, the support brackets 32 accepting the lower edge 33 of the traversing divider walls 26 and the locking pin mechanisms 27 attach to the divider wall pin receiving apertures 30, thus defining the divided cargo spaces 29. The size of the divided cargo spaces 29 can be adjusted by moving the traversing divider wall 26 along the length of the support rails 20 and by moving the longitudinal divider wall 31 along the length of the traversing divider walls 26.

Figure 7:
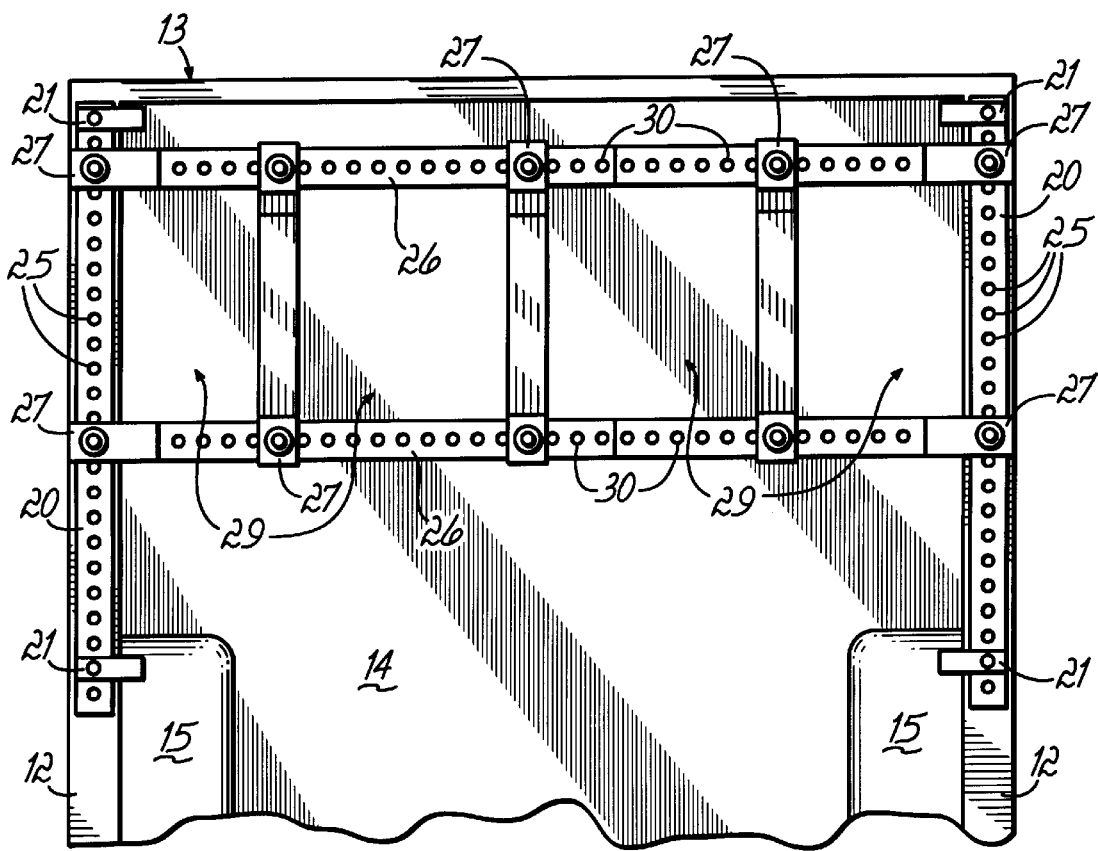
FIG. 7 is a top view of a pick-up truck bed cargo space fit with a cargo space divider depicting its use in defining several smaller divided spaces, according to the preferred embodiment of the present invention.

Referring now to FIG. 7, the cargo space divider 11 is depicted creating a four divided cargo spaces 29 within the truck bed 13. The support rails 20 are secured to the side rails 12 via the C-clamp devices 21 and a pair of traversing divider walls 26 are secured to the support rails 20 by the locking pin mechanism 27. Longitudinal divider walls 31 are secured to the traversing divider walls 26, the support brackets 32 accepting the lower edge 33 of the traversing divider walls 26 and the locking pin mechanisms 27 attach to the divider wall pin receiving apertures 30, thus defining the divided cargo spaces 29. The size of the divided cargo spaces 29 can be adjusted by moving the traversing divider wall 26 along the length of the support rails 20 and by moving the longitudinal divider wall 31 along the length of the traversing divider walls 26.

While the preferred embodiments of the invention have been shown, illustrated, and described, it will be apparent to those skilled in this field that various modifications may be made in these embodiments without departing from the spirit of the present invention. It is for this reason that the scope of the invention is set forth in and is to be limited only by the following claims.

What is claimed is:

1. A cargo space divider for use in a pick-up truck bed having side rails and a floor comprising:

opposing support rails, configured for extending along the side rails of a pick-up truck bed;

at least one traversing divider wall, the traversing dividing wall extending in height from proximate said support rails to proximate the floor of the truck bed and spanning between the width of said truck bed, the traversing divider wall being configured for being telescopically adjusted in length to adjust to the width of the truck bed;

the traversing divider wall including at least one aperture in an upper edge thereof;

at least one longitudinal divider wall, the longitudinal divider wall extending in height from proximate the top of said traversing divider wall to proximate the floor of the truck bed, the longitudinal divider wall being configured for being telescopically adjusted in length;

a locking pin mechanism coupled to said longitudinal divider wall proximate an upper edge of said longitudinal divider wall, the locking pin mechanism operable for removably engaging said aperture in the traversing divider wall at a position along its length to secure the longitudinal divider wall with said traversing divider wall;

said longitudinal divider wall including a support bracket located proximate a lower edge of said longitudinal divider wall, the support bracket configured to accept a bottom edge of said traversing divider wall, so as to further secure the longitudinal divider wall with said traversing divider wall; and wherein said traversing divider wall and said longitudinal divider wall are secured together, creating cargo spaces which may be adjusted in size and position in a truck bed.

2. The cargo space divider of claim 1 wherein said support rails are adjustable to accommodate truck beds of varying sizes.

3. The cargo space divider of claim 1 wherein said traversing divider wall is of two-piece construction, so as to allow the length of the traversing divider wall to be telescopically adjusted.

4. The cargo space divider of claim 1 wherein said longitudinal divider wall is of two-piece construction, so as to allow the length of the longitudinal divider wall to be telescopically adjusted.

5. The cargo space divider of claim 1 wherein said traversing divider wall includes opposing locking pin mechanisms coupled proximate each end of the traversing divider wall, the locking pin mechanisms of the traversing divider wall operable for removably engaging said opposing support rails at a position along the length of said rails.

6. The cargo space divider of claim 1 wherein said traversing divider wall includes a plurality of apertures positioned along its length, said longitudinal divider wall locking pin mechanism configured for being selectively engaged with at least one of said apertures for adjusting the position of the longitudinal divider wall along the length of said traversing divider wall.

7. The cargo space divider of claim 5 wherein said opposing support rails each includes a plurality of apertures positioned along its length, said traversing divider wall locking pin mechanisms each configured for being selectively engaged with at least one of said support rail apertures for adjusting the position of the traversing divider wall along the length of said support rails.

8. The cargo space divider of claim 6 wherein said longitudinal divider wall locking pin mechanism comprises a pin housing for positioning in a pin aperture and an actuator and ball stop located in the housing, the pin actuator, in a first position, driving the ball stop into engagement with said traversing divider wall to secure the pin housing in the pin aperture, and in a second position, releasing the ball stop so that the pin housing may be released from the pin aperture.

9. The cargo space divider of claim 7 wherein said traversing divider wall locking pin mechanisms each comprise a pin housing for positioning in a pin aperture, and an actuator and ball stop located in the housing, the pin actuator, in a first position, driving the ball stop into engagement with a respective said side rail to secure the pin housing in the pin aperture, and in a second position, releasing the ball stop so that the pin housing may be released from the pin aperture.

\* \* \* \* \*

UNITED STATES PATENT AND TRADEMARK OFFICE
CERTIFICATE OF CORRECTION

PATENT NO.   : 6,206,624 B1  
DATED        : March 27, 2001  
INVENTOR(S)  : Rachel Brandenburg It is certified that error appears in the above-identified patent and that said Letters Patent is hereby corrected as shown below:

Column 3,  
Lines 37-51, delete the entire LIST OF REFERENCE NUMBERS TABLE and insert

-- LIST OF REFERENCE NUMBERS

| | |
|---|---|
| 10 Pick-Up Truck | 30 Divider Wall Pin Receiving |
| 11 Cargo Space Divider |     Apertures |
| 12 Side Rails | 31 Longitudinal Divider Wall |
| 13 Truck Bed | 32 Support Brackets |
| 14 Cargo Area | 33 Lower Edge |
| 15 Wheel Well | 40 Pin Housing |
| 16 Truck Cab | 41 Locking Pin Support Bracket |
| 17 Tailgate | 42 Pin Interior Cavity |
| 20 Support Rail | 45 Pin Actuator |
| 21 C-Clamp | 46 Biasing Spring |
| 22 Side Rail Flange | 47 Button End |
| 25 Support Rail Pin Aperture | 50 Ball Stop |
| 26 Traversing Divider Wall | 51 Ball Stop Aperture |
| 27 Locking Pin Mechanism | 55 Ball Stop Recess |
| 29 Divided Cargo Space | 56 Ball Stop Groove -- |

Signed and Sealed this

Tenth Day of September, 2002

Attest:

Attesting Officer

JAMES E. ROGAN  
Director of the United States Patent and Trademark Office